US012233435B2

(12) United States Patent
Boulme et al.

(10) Patent No.: US 12,233,435 B2
(45) Date of Patent: Feb. 25, 2025

(54) ULTRASONIC IMAGING DEVICE WITH LINE AND COLUMN ADDRESSING

(71) Applicant: MODULEUS, Tours (FR)

(72) Inventors: Audren Boulme, Tours (FR); Edgard Jeanne, Tours (FR)

(73) Assignee: MODULEUS, Tours (FR)

( * ) Notice: Subject to any disclaimer, the term of this patent is extended or adjusted under 35 U.S.C. 154(b) by 212 days.

(21) Appl. No.: 17/927,323

(22) PCT Filed: May 19, 2021

(86) PCT No.: PCT/EP2021/063218

§ 371 (c)(1),
(2) Date: Nov. 22, 2022

(87) PCT Pub. No.: WO2021/239525

PCT Pub. Date: Dec. 2, 2021

(65) Prior Publication Data

US 2023/0201875 A1 Jun. 29, 2023

(30) Foreign Application Priority Data

May 28, 2020 (FR) ...................................... 20/05636

(51) Int. Cl.
*B06B 1/02* (2006.01)

(52) U.S. Cl.
CPC .................................. *B06B 1/0292* (2013.01)

(58) Field of Classification Search
CPC .................................................... B06B 1/0292
See application file for complete search history.

(56) References Cited

U.S. PATENT DOCUMENTS

2007/0065962 A1* 3/2007 Pichler ................ H01L 31/0475
257/E27.125
2012/0086307 A1* 4/2012 Kandori ................ B06B 1/0292
310/300

FOREIGN PATENT DOCUMENTS

WO 2017076843 A1 5/2017

OTHER PUBLICATIONS

Authorized Officer: Foussier, Philippe, International Search Report issued in PCT application No. PCT/EP2021/063218, Sep. 15, 2021, 2 pp.
English Translation of the Written Opinion of the International Search Authority issued in PCT application No. PCT/EP2021/063218, Sep. 15, 2021, 4 pp.

* cited by examiner

*Primary Examiner* — Terrance L Kenerly
(74) *Attorney, Agent, or Firm* — Kaplan Breyer Schwarz, LLP

(57) ABSTRACT

An ultrasonic imaging device includes a plurality of ultrasonic transducers arranged in rows and columns. Each transducer has a lower electrode and an upper electrode. In each row, any two neighboring transducers of the row respectively have their lower electrode and their upper electrode connected to each other, or their upper electrode and their lower electrode connected to each other and in each column, any two neighboring transducers in the column respectively have their lower electrode and their upper electrode connected to each other, or their upper electrode and their lower electrode connected to each other.

9 Claims, 7 Drawing Sheets

ULTRASONIC IMAGING DEVICE WITH LINE AND COLUMN ADDRESSING

RELATED APPLICATIONS

The present patent application claims the priority benefit of French patent application FR20/05636 which is herein incorporated by reference.

FIELD

The present disclosure concerns the field of ultrasonic imaging, and more particularly aims at a device comprising an array of ultrasonic transducers with a row and column addressing.

BACKGROUND

An ultrasonic imaging device conventionally comprises a plurality of ultrasonic transducers, and an electronic control circuit connected to the transducers. In operation, the transducer assembly is placed in front of a body, an image of which is desired to be acquired. The electronic device is configured to apply electric excitation signals to the transducers to cause the emission of ultrasound waves by the transducers, towards the body or object to be analyzed. The ultrasound waves emitted by the transducers are reflected by the body to be analyzed (by its internal and/or surface structure), and then return to the transducers, which convert them back into electric signals. The electric response signals are read by the electronic control circuit and may be stored and analyzed to deduce therefrom information relative to the studied body.

The ultrasonic transducers may be arranged in a linear array in the case of two-dimensional image acquisition devices, or in an array in the case of three-dimensional image acquisition devices. In the case of a two-dimensional image acquisition device, the acquired image is representative of a cross-section of the studied body in a plane defined by the alignment axis of the transducers of the linear array on the one hand, and by the emission direction of the transducers on the other hand. In the case of a three-dimensional image acquisition device, the acquired image is representative of a volume defined by the two alignment directions of the transducers of the array and by the emission direction of the transducers.

Among three-dimensional image acquisition devices, one can distinguish devices called "fully populated", where each transducer of the array is individually addressable, and device called row-column addressing or RCA where the transducers of the array are addressable by row and by column.

Fully populated devices provide a greater flexibility in the shaping of the ultrasound beams in transmit and in receive mode. The control electronics of the array is however complex, the required number of transmit/receive channels being equal to M*N in the case of an array of M row by N columns. Further, the signal-to-noise ratio is generally relatively low since each transducer has a smaller surface area of exposure to ultrasound waves.

RCA-type devices use algorithms for shaping the different ultrasound beams. The beam shaping possibilities may be decreased with respect to fully populated devices. However, the control electronics of the array is considerably simplified, the number of required transmit/receive channels being decreased to M+N in the case of an array of M rows and N columns. Further, the signal-to-noise is improved due to the interconnection of the transducers in a row or in a column during transmit and receive phases.

Three-dimensional image acquisition devices with a row-column addressing (RCA) are here more particularly considered.

SUMMARY OF THE INVENTION

An object of an embodiment is to provide a three-dimensional ultrasound image acquisition device with a row-column addressing, overcoming all or part of the disadvantages of known devices.

For this purpose, an embodiment provides an ultrasonic imaging device comprising a plurality of ultrasonic transducers arranged in rows and in columns, each transducer comprising a lower electrode and an upper electrode, wherein:

- in each row, any two neighboring transducers in the row respectively have their lower electrode and their upper electrode connected to each other, or their upper electrode and their lower electrode connected to each other; and
- in each column, any two neighboring transducers in the column respectively have their lower electrode and their upper electrode connected to each other, or their upper electrode and their lower electrode connected to each other.

According to an embodiment:

- in each row, any two neighboring transducers in the row have their respective lower electrodes electrically insulated from each other and their respective upper electrodes electrically insulated from each other; and
- in each column, any two neighboring transducers in the column have their respective lower electrodes electrically insulated from each other and their respective upper electrodes electrically insulated from each other.

According to an embodiment, each ultrasonic transducer is a CMUT transducer comprising a flexible membrane suspended above a cavity, the lower electrode of the transducer being arranged on the side of the cavity opposite to the flexible membrane, and the upper electrode of the transducer being arranged on the side of the flexible membrane opposite to the cavity.

According to an embodiment, the cavities of the transducers are formed in a rigid support layer, and each transducer has its upper electrode electrically connected to a lower electrode of a neighboring transducer via a conductive element crossing the rigid support layer.

According to an embodiment, the lower electrode of each transducer is made of a doped semiconductor material.

According to an embodiment, a metal layer portion extends under the lower electrode of each transducer, in contact with the lower surface of the lower electrode of the transducer.

According to an embodiment, in each transducer, the flexible membrane is made of a semiconductor material.

According to an embodiment, in each transducer, a dielectric layer coats the upper surface of the lower electrode of the transducer, at the bottom of the cavity.

According to an embodiment, each transducer is a PMUT transducer.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various possible applications of described imaging devices have not been detailed, the described embodiments being compatible with usual applications of ultrasonic imaging devices. In particular, the properties (frequencies, shapes, amplitudes, etc.) of the electric excitation signals applied to the ultrasonic transducers have not been detailed, the described embodiments being compatible with the excitation signals currently used in ultrasonic imaging systems, which may be selected according to the considered application and in particular to the nature of the body to be analyzed and to the type of information which is desired to be acquired. Similarly, the various processings applied to the electric signals delivered by the ultrasonic transducers to extract useful information relative to the body to be analyzed have not been detailed, the described embodiments being compatible with processings currently implemented in ultrasonic imaging systems. Further, the circuits for controlling the ultrasonic transducers of the described imaging devices have not been detailed, the embodiments being compatible with all or most of known circuits for controlling ultrasonic transducers of array ultrasonic imaging devices with a row-column addressing. Further, the forming of the ultrasonic transducers of the described imaging devices has not been detailed, the described embodiments being compatible with all or most of known ultrasonic transducer structures.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1:
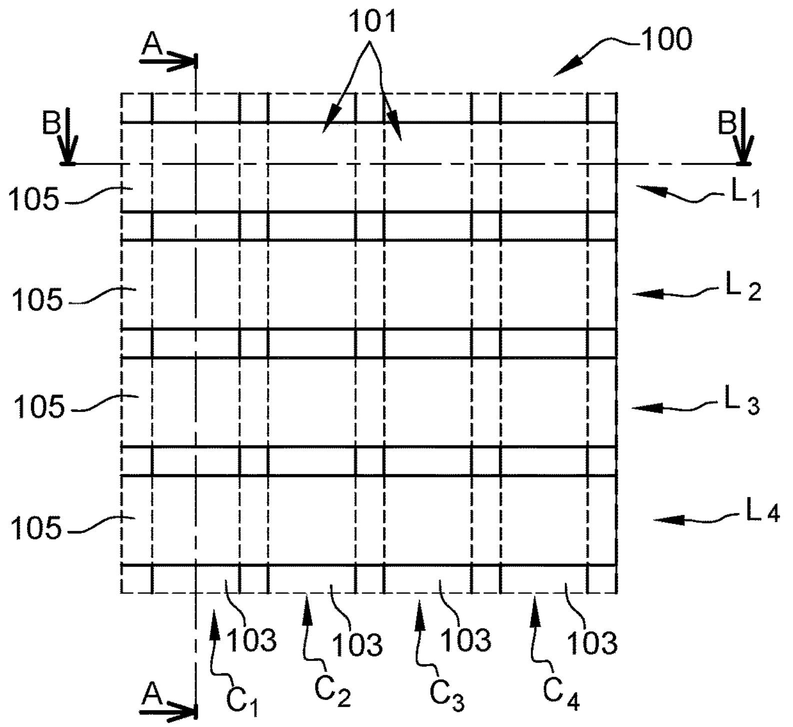
FIG. 1 is a top view schematically and partially illustrating an example of an array ultrasonic imaging device with a row-column addressing.

FIG. 1 is a top view schematically and partially illustrating an example of an array ultrasonic imaging device with a row-columns addressing 100.

Figure 2A:
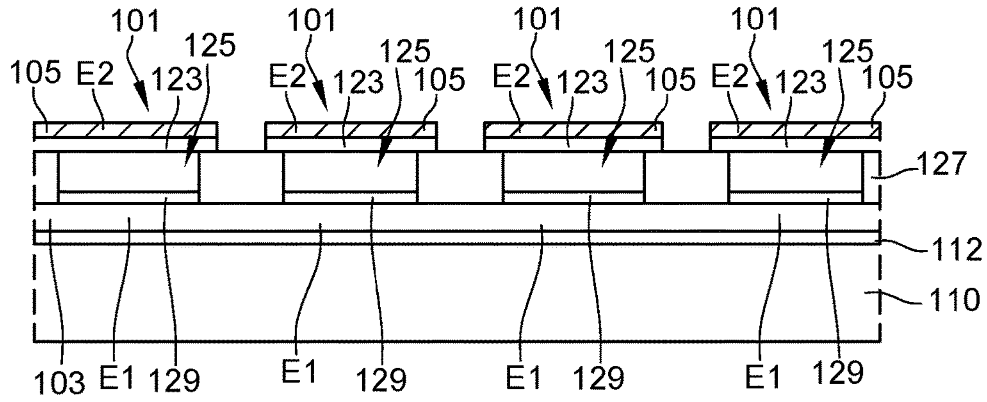
FIG. 2A is a cross-section view along plane A-A of FIG. 1, illustrating in further detail an example of embodiment of the device of FIG. 1.
Figure 2B:
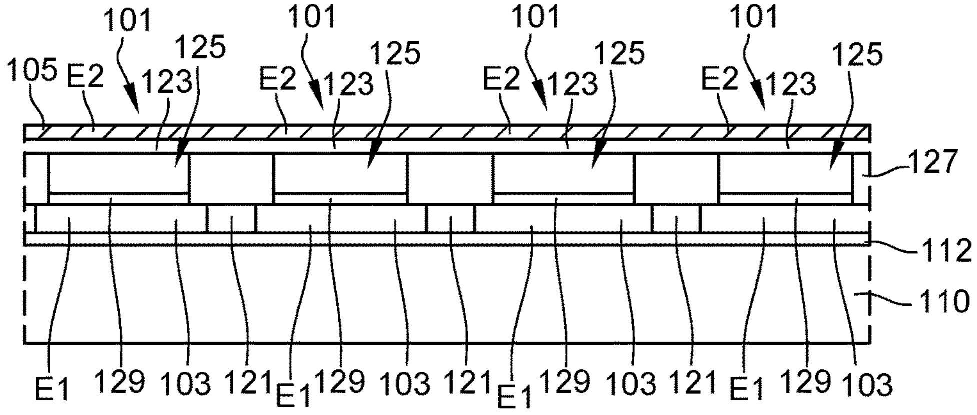
FIG. 2B is a corresponding cross-section view along plane B-B of FIG. 1.

FIGS. 2A and 2B are cross-section views of the device 100 of FIG. 1 respectively along planes A-A and B-B of FIG. 1.

Device 100 comprises a plurality of ultrasonic transducers 101 arranged in an array of M rows $L_i$ and N columns $C_i$, M and N being integers greater than or equal to 2, i an integer in the range from 1 to M, and j an integer in the range from 1 to N.

In FIG. 1, four rows $L_1$, $L_2$, $L_3$, $L_4$ and four columns $C_1$, $C_2$, $C_3$, $C_4$ have been shown. In practice, the numbers M of rows and N of columns of device 100 may of course be different from 4.

Each transducer 101 of device 100 comprises a lower electrode E1 and an upper electrode E2 (FIGS. 2A and 2B). When an appropriate excitation voltage is applied between its electrodes E1 and E2, the transducer emits an ultrasonic acoustic wave. When the transducer receives an ultrasonic acoustic wave within a given wavelength range, it delivers between its electrodes E1 and E2 a voltage representative of the received wave.

In this example, transducers 101 are capacitive transducers with a membrane, also called CMUT transducers (“capacitive micromachined ultrasonic transducers”).

In each column $C_j$ of the array of transducers, the transducers 101 in the column have their respective lower electrodes E1 connected to one another. The lower electrodes E1 of transducers 101 of different columns are however not connected to one another. Further, in each row $L_i$ of the array of transducers, the transducers 101 in the row have their respective upper electrodes E2 connected to one another. The upper electrodes E2 of transducers 101 of different rows are however not connected to one another.

In each column $C_j$ of device 100, the lower electrodes E1 of the transducers 101 in the column form a continuous conductive or semiconductor strip 103, extending along substantially the entire length of the column. As a variant, each strip 103 of electrodes E1 comprises a vertical stack of a semiconductor strip and of a conductive strip, each extending along substantially the entire length of the column. Further, in each row $L_i$ of device 100, the upper electrodes E2 of the transducers 101 in the row form a continuous conductive or semiconductor strip 105, extending along substantially then entire length of the row. As a variant, each strip 105 of electrodes E2 comprises a vertical stack of a semiconductor strip and of a conductive strip, each extending along substantially the entire length of the row. For simplification, only the lower and upper electrode strips 103 and 105 are shown in FIG. 1.

In the shown example, the strips 103 forming the column electrodes are made of a doped semiconductor material, for example of doped silicon. Further, in this example, the strips 105 forming the row electrodes are made of metal. As an example, in top view, the lower strips 103 are parallel to one another, and the upper strips 105 are parallel to one another and perpendicular to strips 103.

In the example of FIG. 1, device 100 comprises a support substrate 110, for example, made of a semiconductor material, for example, of silicon. The array of ultrasonic transducers 101 is arranged on the upper surface of substrate 110. More particularly, in this example, a dielectric layer 112, for example, a silicon oxide layer, forms an interface between substrate 110 and the array of ultrasonic transducers 101. Dielectric layer 112 for example continuously extends over the entire upper surface of support substrate 110. As an example, layer 112 is in contact, by its lower surface, with the upper surface of substrate 110, across substantially the entire upper surface of substrate 110.

Lower electrode strips 103 are arranged on the upper surface of dielectric layer 112, for example in contact with the upper surface of dielectric layer 112. Strips 103 may be laterally separated from one another by dielectric strips 121, for example, made of silicon oxide, extending parallel to strips 103 and having a thickness substantially identical to that of strips 103.

Each transducer 101 comprises a cavity 125 formed in a rigid support layer 127, and a flexible membrane 123 suspended above cavity 125. Layer 127 is for example a silicon oxide layer. Layer 127 is arranged on the upper surface, for example, substantially planar, of the assembly formed by alternated strips 103 and 121. In each transducer 101, cavity 125 is located in front of the lower electrode E1 of the transducer.

In the shown example, each transducer 101 comprises a single cavity 125 in front of its lower electrode E1. As a variant, in each transducer 101, cavity 125 may be divided into a plurality of elementary cavities, for example arranged, in top view, in an array of rows and columns, laterally separated from one another by lateral walls formed by portions of layer 127.

In the shown example, at the bottom of each cavity 125, a dielectric layer 129, for example, made of silicon oxide, coats the lower electrode E1 of the transducer, to prevent any electric contact between the flexible membrane 123 and the lower electrode E1 of the transducer. As a variant, to ensure this electric insulation function, a dielectric layer (not shown) may coat the lower surface of membrane 123. In this case, layer 129 may be omitted.

In each transducer 101, flexible membrane 123, coating the cavity 125 of the transducer, is for example made of a doped or undoped semiconductor material, for example, of silicon.

In each transducer 101, the upper electrode E2 of the transducer is arranged on top of and in contact with the upper surface of the flexible membrane 123 of the transducer, vertically in line with cavity 125 and with the lower electrode E1 of the transducer. As a variant, in the case of a semiconductor membrane, the upper electrode E2 of each transducer 101 may be formed by the actual membrane, in which case layer 105 can be omitted.

As an example, in each row $L_i$ of device 100, the flexible membranes 123 of the transducers 101 in the row form a continuous membrane strip extending along substantially the entire length of the row, laterally separated from the membrane strips of the neighboring rows by a dielectric region. In each row $L_i$, the membrane strip 123 of the row for example coincides, in top view, with the upper electrode strip 105 of the row.

For each row $L_i$ of the array of transducers 101, device 100 may comprise a transmit circuit, a receive circuit, and a switch controllable to, in a first configuration, connect the electrodes E2 of the transducers of the row to an output terminal of the transmit circuit of the row and, in a second configuration, connect the electrodes E2 of the transducers of the row to an input terminal of the receive circuit of the row.

Further, for each column C of the array of transducers 101, device 100 may comprise a transmit circuit, a receive circuit, and a switch controllable to, in a first configuration, connect the electrodes E1 of the transducers of the column to an output terminal of the transmit circuit of the column, and, in a second configuration, connect the electrodes E1 of the transducers of the column to an input terminal of the receive circuit of the column.

For simplification, the transmit and receive circuits and the switches of device 100 have not been shown in the drawings. Further, the forming of these elements has not been detailed, the described embodiments being compatible with usual embodiments of transmit/receive circuits of array ultrasonic imaging devices with a row-column addressing. As a non-limiting example, the transmit/receive circuits may be identical or similar to those described in French patent application No. 19/06515 filed by the applicant on Jun. 18, 2019.

A limitation of the device of FIG. 1 is linked to the fact that the capacitive coupling between lower electrode strips 103 and substrate 110 is much higher than the capacitive coupling between upper electrode strips 105 and substrate 110. This results in a behavior difference between the rows $L_i$ and the columns $C_j$ of the device. More particularly, this results in a difference in the sensitivity in receive mode between the rows $L_i$ and the columns $C_j$ of the device. It can in particular be observed that, for a same received acoustic power, the voltage generated on the upper electrode strip 105 of a row $L_i$ during a phase of reading from row $L_i$ is much higher than the voltage generated on the lower electrode strip 103 of a column $C_j$ during a phase of reading from column $C_j$. This may result in undesirable artifacts in the acquired image.

Figure 3:
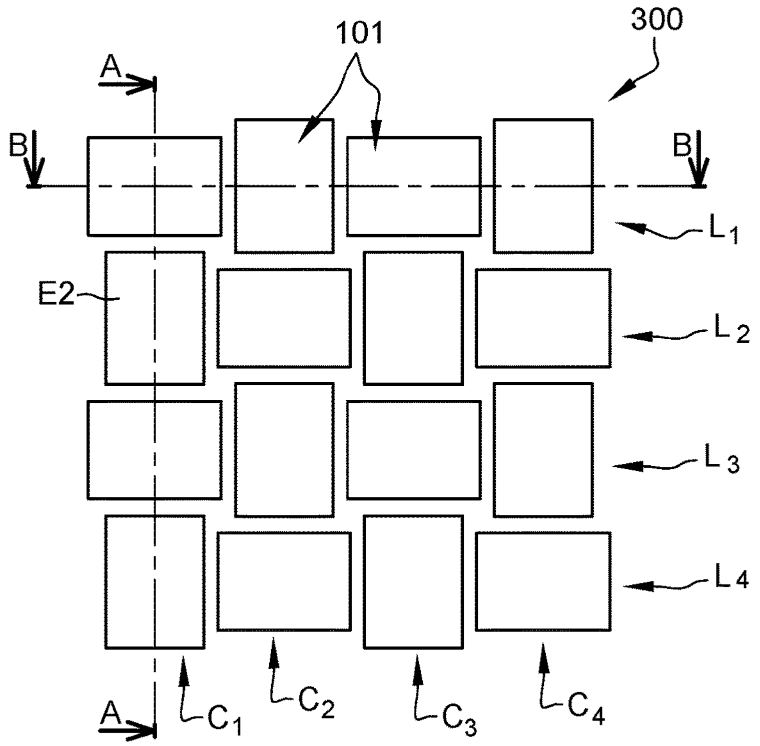
FIG. 3 is a top view schematically and partially illustrating an embodiment of an array ultrasonic imaging device with a row-column addressing.

FIG. 3 is a top view schematically and partially illustrating an example of an embodiment of an array ultrasonic imaging device with a row-column addressing 300.

Figure 4A:
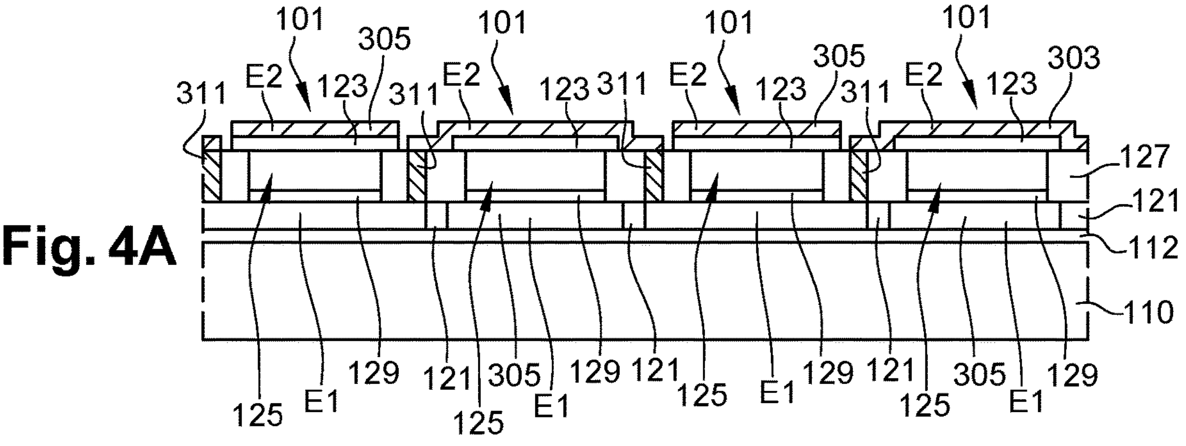
FIG. 4A is a cross-section view along plane A-A of FIG. 3, illustrating in further detail an example of embodiment of the device of FIG. 3.
Figure 4B:
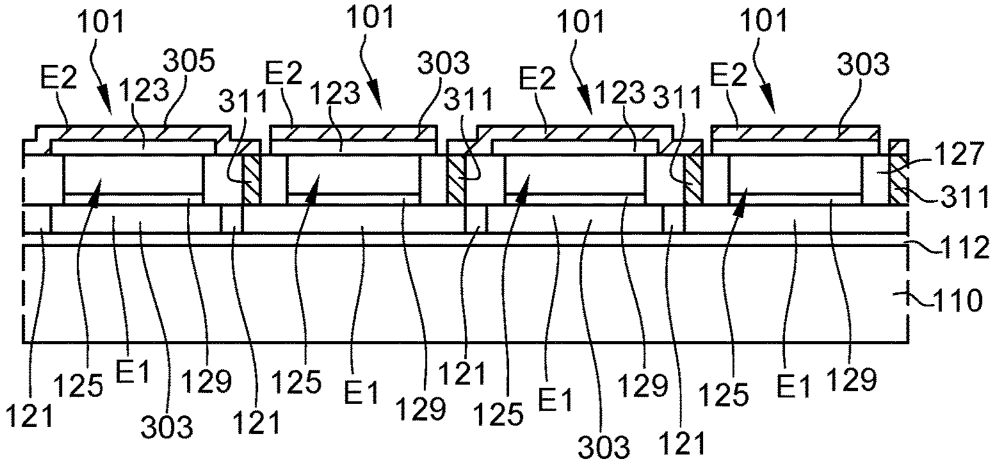
FIG. 4B is a corresponding cross-section view along plane B-B of FIG. 3.

FIGS. 4A and 4B are cross-section views of the device 300 of FIG. 3 respectively along planes A-A and B-B of FIG. 3.

Device 300 has elements common with the previously-described device 100. These common elements will not be detailed again hereafter. In the rest of the description, only the differences with respect to device 100 will be highlighted.

Like device 100, device 300 comprises a plurality of ultrasonic transducers 101 arranged in an array of M rows $L_i$ and N columns $C_j$.

As in device 100, each transducer 101 of device 300 comprises a lower electrode E1 and an upper electrode E2. For simplification, only the upper electrodes E2 are shown in FIG. 3.

Device 300 differs from device 100 mainly by the scheme of interconnection of the lower and upper electrodes E1 and E2 of the transducers 101 of the device.

In device 300, in each row $L_i$ de transducers 101, any two neighboring transducers $\mathbf{101}_{ij}$ and $\mathbf{101}_{ij+1}$ in the row ($\mathbf{101}_{ij}$ and $\mathbf{101}_{ij+1}$ here respectively designating the transducer 101 of row $L_i$ and of column $C_j$ of the array, and the transducer 101 of row $L_i$ and of column $C_{j+1}$ of the array), respectively have their lower electrode E1 and their upper electrode E2 connected to each other, or their upper electrode E2 and their lower electrode E1 connected to each other. The upper electrodes E2 of transducers $\mathbf{101}_{ij}$ and $\mathbf{101}_{ij+1}$ are however electrically insulated from each other. Similarly, the lower electrodes E1 of transducers $\mathbf{101}_{ij}$ and $\mathbf{101}_{ij+1}$ are electrically insulated from each other.

Similarly, in each column C of transducers 101, any two neighboring transducers $\mathbf{101}_{ij}$ and $\mathbf{101}_{i+ij}$ in the column ($\mathbf{101}_{i+1j}$ here designating the transducer 101 of row $L_{i+1}$ and of column $C_j$) respectively have their lower electrode E1 and their upper electrode E2 connected to each other, or their upper electrode E2 and their lower electrode E1 connected to each other. The upper electrodes E2 of transducers $\mathbf{101}_{ij}$ and $\mathbf{101}_{i+1j}$ are however electrically insulated from each other. Similarly, the lower electrodes E1 of transducers $\mathbf{101}_{ij}$ and $\mathbf{101}_{i+1j}$ are electrically insulated from each other.

Thus, in each column $C_j$ of device 300, a column conductor 303 common to all the transducers 101 in the column winds vertically between the transducers in the column, alternately running through the lower and upper electrodes E1 and E2 of the transducers in the column. Similarly, in each row $L_i$ of device 300, a row conductor 305 common to all the transducers 101 in the row winds vertically between the transducers in the row, alternately running through the lower and upper electrodes E1 and E2 of the transducers in the row.

In this example, the electric connections between the upper and lower electrodes E2 and E1 of neighboring transducers are formed by connection elements 311, for example, made of metal, vertically crossing the portions of dielectric layer 127 laterally separating the cavities 125 of the transducers. More particularly, in the example of FIGS. 4A and 4B, each connection element 311 extends vertically from the lower surface of the upper electrode E2 of a transducer 101 to the upper surface of the lower electrode of a neighboring transducer.

In device 300, dielectric regions 121 form, in top view, a continuous gate entirely surrounding each electrode E1 and laterally separating each electrode E1 from the electrodes E1 of the neighboring transducers. Similarly, in top view, each electrode E2 is entirely surrounded and laterally separated from the electrodes E2 of the neighboring transducers by a dielectric region (possibly air or vacuum).

As an example, in top view, each flexible membrane 123 is entirely surrounded and laterally separated from the membranes 123 of the neighboring transducers by a dielectric region. As a variant, flexible membranes 123 may be made of a dielectric material, for example, silicon oxide. In this case, the membranes of neighboring transducers may form a continuous layer.

The operation of device 300 is substantially identical to that of the previously-described device 100, by replacing the column conductors 103 and the row conductors 105 of device 100, respectively arranged on the lower surface side and on the upper surface side of transducers 101, with respectively column conductors 303 and row conductors 305, each winding between the transducers of the corresponding row or column, and alternately running through the lower and upper electrodes E1 and E2 of the transducers of the row or of the column.

Thus, for each row $L_i$ of transducer array 101, device 300 may comprise a transmit circuit, a receive circuit, and a switch controllable to, in a first configuration, connect the row conductor 305 of row $L_i$ to an output terminal of the transmit circuit of the row, and, in a second configuration, connect the row conductor 305 of row $L_i$ to an input terminal of the receive circuit of the row.

Further, for each column C of the array of transducers 101, device 300 may comprise a transmit circuit, a receive circuit, and a switch controllable to, in a first configuration, connect the column conductor 303 of column $C_j$ to an output terminal of the transmit circuit of the column, and, in a second configuration, connect the column conductor 303 of column $C_j$ to an input terminal of the receive circuit of the column.

An advantage of device 300 is that the capacitive coupling of row conductors 305 with substrate 110 and the capacitive coupling of column conductors 303 with substrate 110 are substantially identical. This enables to symmetrize the behavior of the rows $L_i$ and of the columns $C_j$ of the device. In particular, the sensitivity in receive mode is substantially identical in the rows and in the columns of the device, which enables to improve the quality of the acquired images. This further enables to have substantially the same electrical properties, and particularly substantially the same impedance, on the rows and the columns.

Figure 5A:
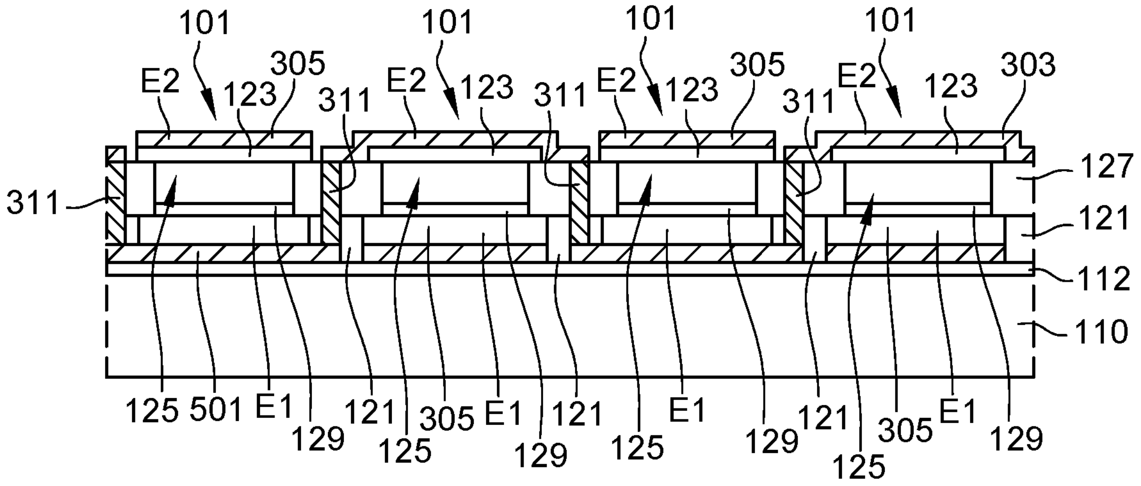
FIG. 5A is a cross-section view along plane B-B of FIG. 3, illustrating in further detail another example of embodiment of the device of FIG. 3.
Figure 5B:
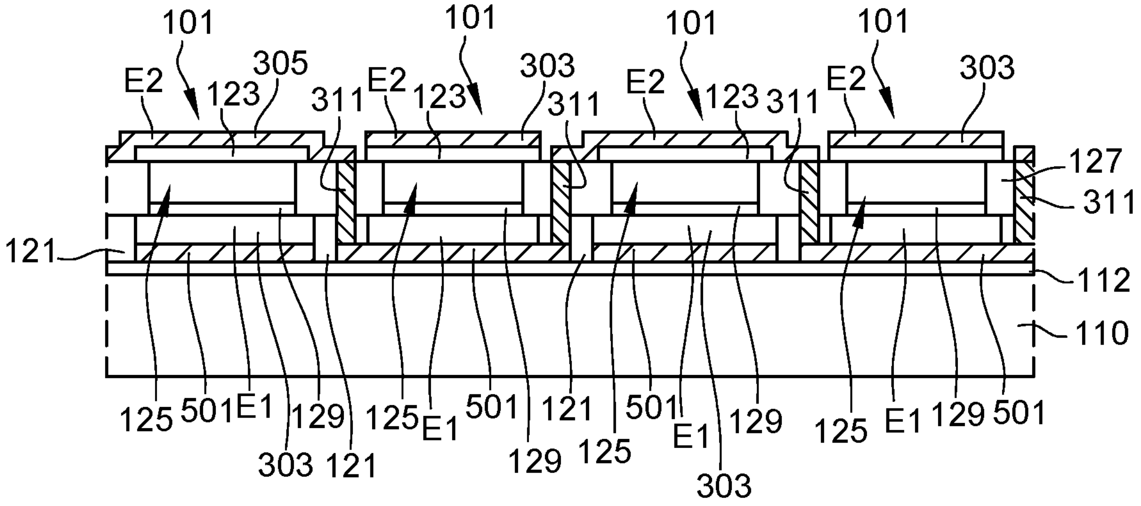
FIG. 5B is a corresponding cross-section view along plane B-B of FIG. 3.

FIGS. 5A and 5B are cross-section views respectively along planes A-A and B-B of FIG. 3, illustrating an alternative embodiment of device 300.

The variant of FIGS. 5A and 5B differs from what has been previously described in relation with FIGS. 3, 4A, and 4B mainly in that, in this variant, under each electrode E1 of the device, there extends a metal layer portion 501, for example made of the same metal as the upper electrodes E2 of the device. Layer 501 is in contact, by its upper surface, with the lower surface of electrodes E1. As an example, layer 501 is in contact, by its lower surface, with the upper surface of dielectric layer 112. In this example, each connection element 311 extends vertically from the lower surface of the upper electrode E2 of a transducer 101 to the upper surface of the metal layer portion 501 of a neighboring transducer 101.

An advantage of this alternative embodiment is that it enables, in the case where the lower electrodes E1 of the transducers are made of a semiconductor material, to increase the electric conductivity of the conductive row and column elements 305 and 303 at the level of the lower electrodes E1 of the transducers.

FIGS. 6A to 6K are cross-section views illustrating steps of an example of a method of manufacturing a device of the type illustrated in FIGS. 4A and 4B.

Figure 6A:
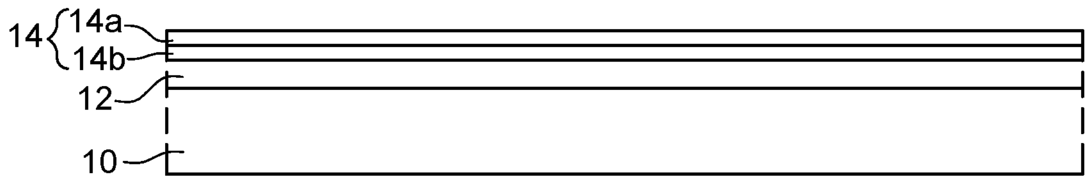
FIGS. 6A to 6K are cross-section views illustrating steps of an example of a method of manufacturing a device of the type illustrated in FIGS. 4A and 4B.

FIG. 6A illustrates a step of oxidation of a portion of the thicknesss of a semiconductor layer of a SOI-type ("Semiconductor On Insulator") structure.

The initial structure comprises a support substrate 10, for example, made of a semiconductor material, for example, made of silicon, a dielectric layer 12, for example made of silicon oxide, coating the upper surface of substrate 10, and a semiconductor layer 14, for example a single-crystal silicon layer, coating the upper surface of dielectric layer 12. Dielectric layer 12 and upper semiconductor layer 14 for example each continuously extend with a substantially constant thickness over the entire upper surface of substrate 10. In this example, dielectric layer 12 is in contact, by its lower surface, with the upper surface of substrate 10, and semiconductor layer 14 is in contact, by its lower surface, with the upper surface of dielectric layer 12.

FIG. 6A more particularly illustrates a step of oxidation of an upper portion of semiconductor layer 14. During this step, the upper portion of layer 14 is transformed into a layer 14*a* of a dielectric material, for example, silicon oxide (in the case where the initial layer 14 is made of silicon). The nature of the lower portion 14*b* of layer 14 remains unchanged.

As an example, the oxidation of the upper portion of layer 14 is performed by a dry thermal oxidation method. The initial thickness of semiconductor layer 14 is for example in the range from 50 nm to 3 μm. The thickness of insulating layer 14*a* after oxidation is for example in the range from 10 to 500 nm, for example in the order of 50 nm.

Figure 6B:
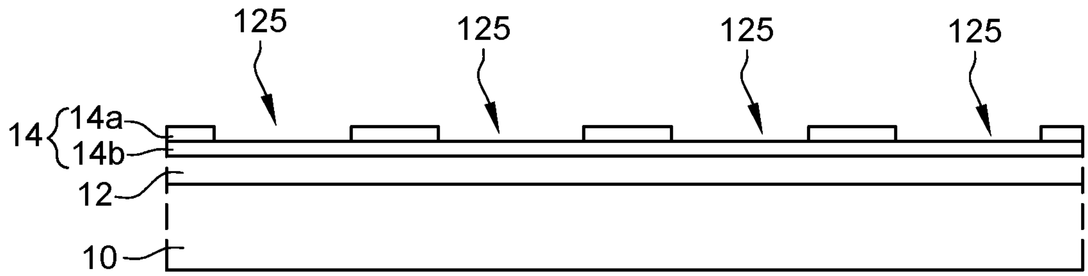

FIG. 6B illustrates a step of forming, in insulating layer 14*a*, of local cavities corresponding to the cavities 125 of the CMUT transducers.

Cavities 125 extend vertically from the upper surface of insulating layer 14*a*, towards layer 14*b*. In the shown example, cavities 125 are through, that is, they emerge onto the upper surface of semiconductor layer 14*b*.

Cavities 125 may be formed by etching, for example, by plasma etching. An etch mask may be used to define the position of cavities 125.

Figure 6C:
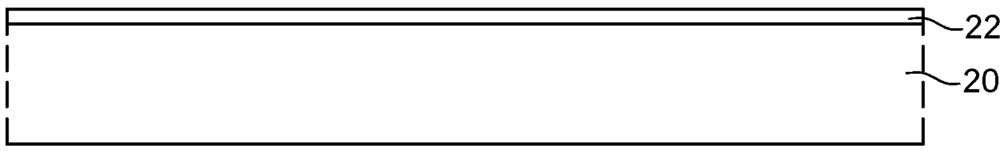

FIG. 6C illustrates a step of oxidation of the upper surface of a second semiconductor substrate 20, for example, made of silicon. During this step, a dielectric layer 22, for example, made of silicon oxide, is formed on the upper surface side of substrate 20. The oxidation may be performed by a dry thermal oxidation method. The thickness of dielectric layer 22 formed during this step is for example in the range from 50 nm to 1 μm, for example in the order of 100 nm.

Figure 6D:
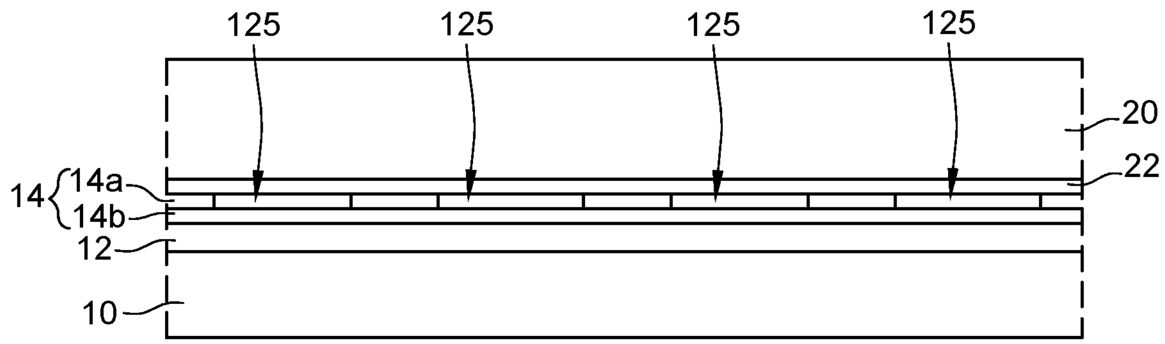

FIG. 6D illustrates a step of transfer of the assembly comprising substrate 20 and dielectric layer 22 onto the upper surface of the structure obtained at the end of the steps of FIGS. 6A and 6B. More particularly, in the shown example, substrate 20 is flipped with respect to the orientation of FIG. 6C, and transferred onto the structure of FIG. 6B, so that the lower surface of layer 22 comes into contact with the upper surface of layer 14*a*. The two structures are bonded to each other by direct bonding or molecular bonding of the lower surface of layer 22 with the upper surface of layer 14*a*. Dielectric layer 22 thus closes cavities 125 from their upper surface.

Figure 6E:
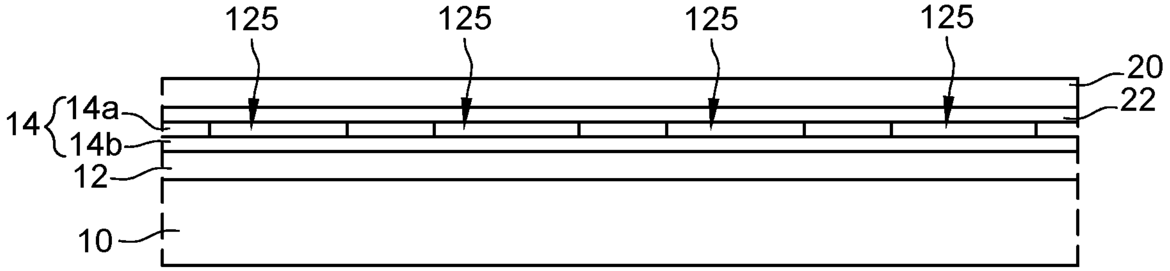

FIG. 6E illustrates a step of thinning of substrate 20 from its surface opposite to dielectric layer 22, that is, from its upper surface in the orientation of FIG. 6E. The thinning is for example performed by grinding. The initial thickness of substrate 20 before thinning is for example in the order of 700 μm. After the thinning, the thickness of the substrate may be in the range from 300 nm to 100 μm.

Figure 6F:
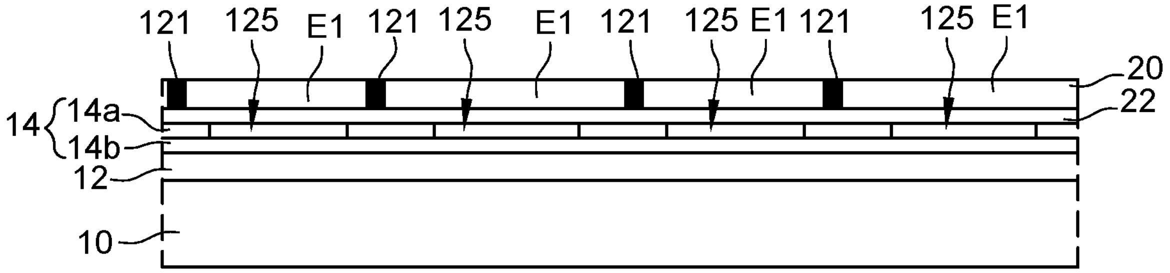

FIG. 6F illustrates a step of forming of insulating trenches 121 filled with a dielectric material, for example, silicon oxide, from the upper surface of the thinned substrate 20. Trenches 121 (in black in FIG. 6F) correspond to the dielectric regions 121 of FIGS. 4A and 4B. Trenches 121 thoroughly cross substrate 20, across its entire thickness, and emerge onto the upper surface of insulating layer 22. Trenches 121 are for example formed by deep reactive ion etching of substrate 20, and then filled with a dielectric material. The portions of substrate 20 delimited by the trenches correspond to the electrodes E1 of the transducers.

Figure 6G:
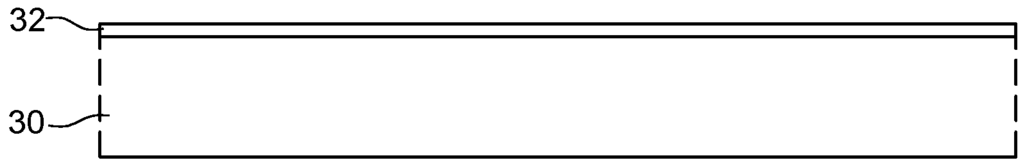

FIG. 6G illustrates a step of oxidation of the upper surface of a third semiconductor substrate 30, for example, made of silicon. During this step, a dielectric layer 32, for example, made of silicon oxide, is formed on the upper surface side of substrate 30. The oxidation may be performed by a dry thermal oxidation method. The thickness of the dielectric layer 32 formed during this step is for example in the range from 100 nm to 10 μm, for example in the order of 2 μm, for example in the range from 2 to 10 μm. As a variant, layer 32 may be formed by deposition of an insulating material, for example, silicon oxide, on the upper surface of substrate 30. Further, as a variant, substrate 30 may be a substrate made of a dielectric material, for example, glass, or a semiconductor substrate of high resistivity, for example, an undoped or lightly-doped silicon substrate.

Figure 6H:
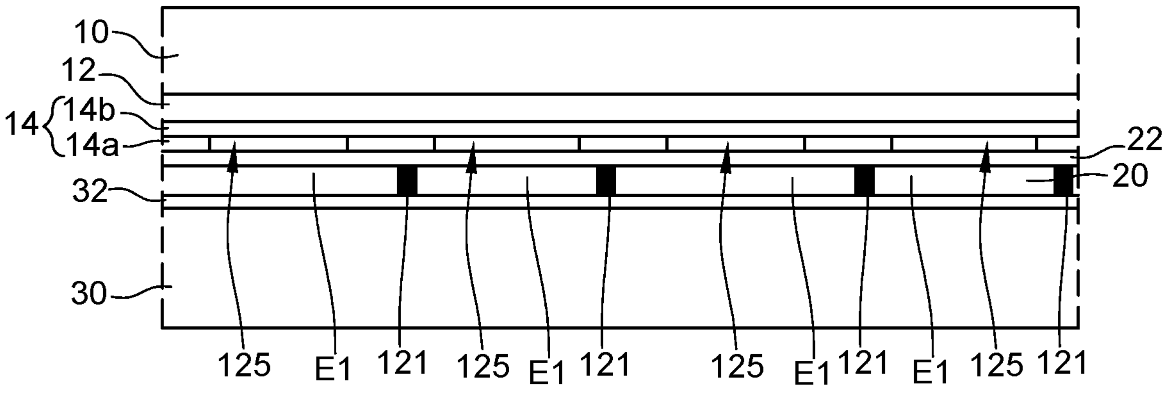

FIG. 6H illustrates a step of transfer of the structure of FIG. 6F onto the structure of FIG. 6G. In the shown example, the structure of FIG. 6F is flipped with respect to the orientation of FIG. 6F, and transferred onto the structure of FIG. 6G so that the lower surface of electrodes E1 and the lower surface of dielectric regions 121 come into contact with the upper surface of dielectric layer 32. The two structures are bonded to each other by direct bonding of the lower surface of electrodes E1 and of the dielectric regions 121 on the upper surface of dielectric layer 32.

FIG. 61 illustrates a subsequent step of removal of substrate 10 and of the dielectric layer 12 of the initial structure. Thus, only semiconductor layer 14*b* is kept above the cavities, to form the membranes 123 of the transducers.

Figure 6I:
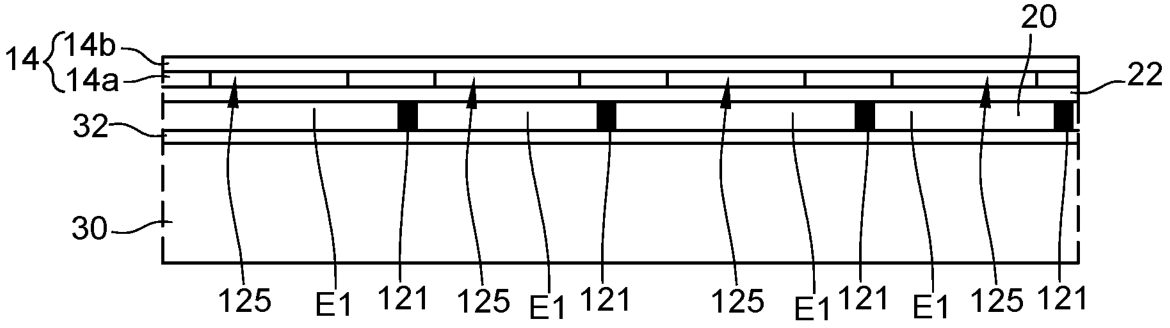
Figure 6J:
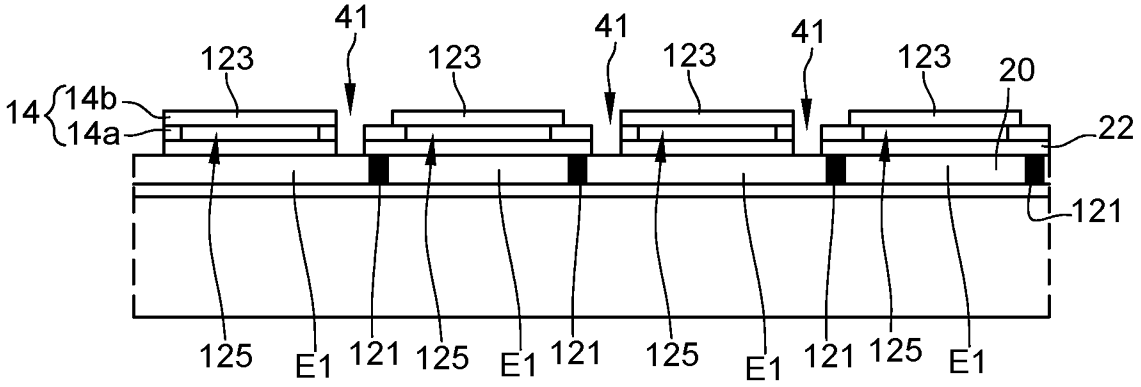

FIG. 6J illustrates the structure obtained at the end of one or a plurality of subsequent steps of structuring of semiconductor layer 14*b* and of dielectric layers 14*a* and 22, to on the one hand delimit the flexible membranes 123 of the transducers in semiconductor layer 14*b*, and on the other hand form, in dielectric layers 14*a* and 22, openings 41 of access to the upper surface of the electrodes E1 of the transducers.

Figure 6K:
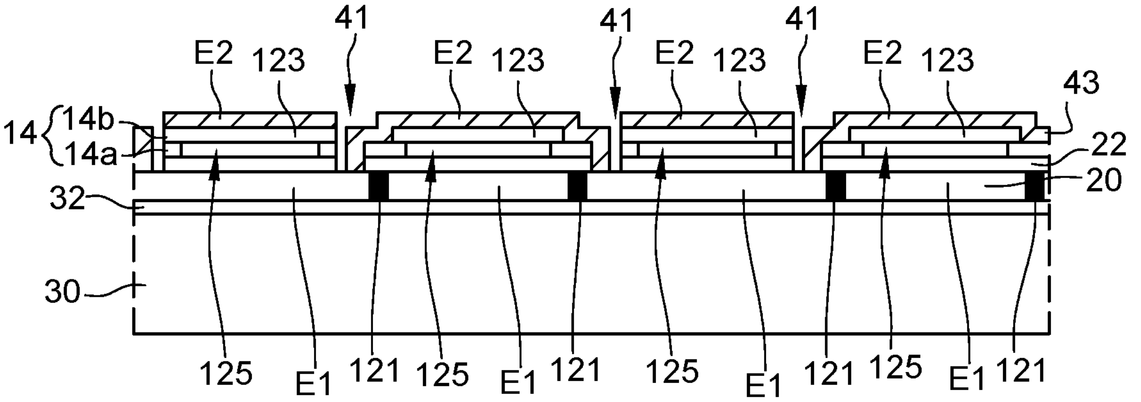

FIG. 6K illustrates a subsequent step of deposition of a metal layer 43 over the entire upper surface of the structure of FIG. 6I, and then of structuring of metal layer 43, for example by photolithography and etching, to delimit the upper electrodes E2 of the transducers.

In this example, the connection elements 311 of the structure of FIGS. 4A and 4B correspond to portions of layer 43 coating the sides of openings 41 and coming into contact with the upper surface of electrodes E1 at the bottom of openings 41. The substrate 110 and the dielectric layer 112 of the structure of FIGS. 4A and 4B respectively correspond to substrate 30 and to dielectric layer 32. The dielectric regions 127 and 129 of the structure of FIGS. 4A and 4B, forming the lateral walls and the bottom of cavities 125, correspond to layers 14*a* and 22.

Figure 7A:
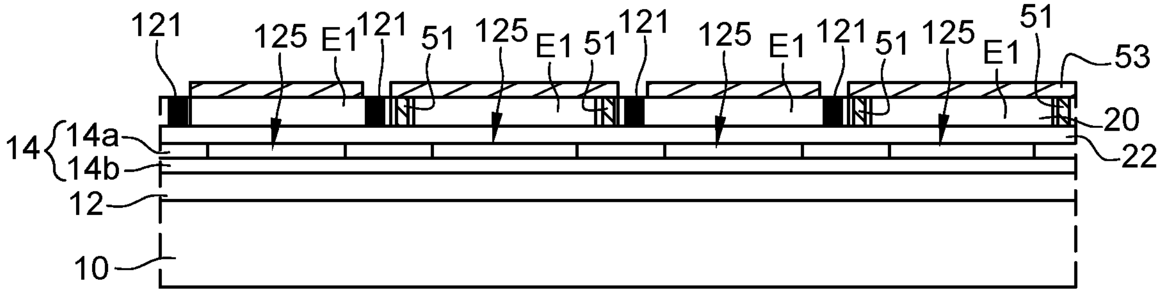
FIGS. 7A to 7C are cross-section views illustrating steps of an example of a method of manufacturing a device of the type illustrated in FIGS. 5A and 5B.
Figure 7B:
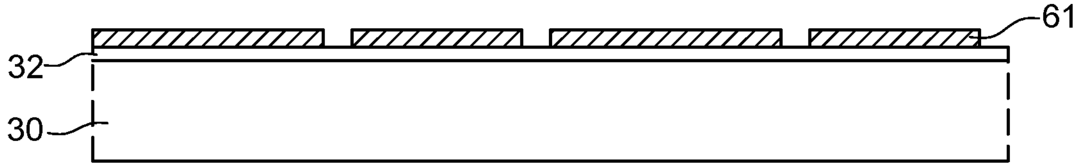
Figure 7C:
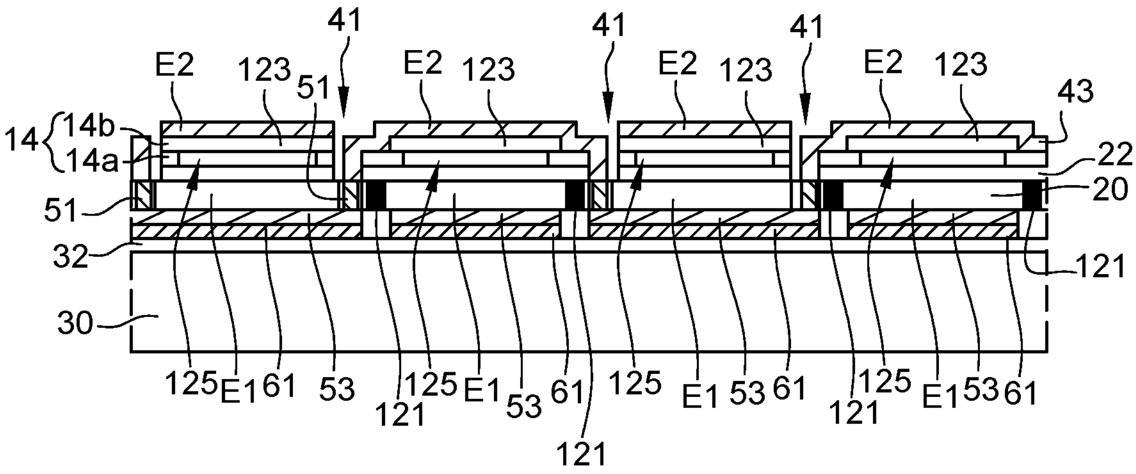

FIGS. 7A to 7C are cross-section views illustrating steps of an example of a method of manufacturing a device of the type illustrated in FIGS. 5A and 5B.

The initial steps of the method are identical to what has been previously described in relation with FIGS. 6A to 6G.

FIG. 7A illustrates the structure obtained at the end of the following successive additional steps, starting from the structure of FIG. 6F:

forming of laterally-insulated conductive vias 51, vertically crossing semiconductor layer 20 across its entire thickness and emerging onto the upper surface of dielectric layer 22;

deposition of a metal layer 53 on the upper surface of the structure, metal layer 53 being in contact, by its lower surface, with the upper surface of electrodes E1 and with the upper surface of conductive vias 51; and local removal of metal layer 53, for example, in front of dielectric regions 121, to electrically insulate electrodes E1 from one another.

FIG. 7B illustrates the structure obtained at the end of the following successive additional steps, starting from the structure of FIG. 6G:

deposition of a metal layer 61 on the upper surface of the structure, metal layer 61 being in contact, by its lower surface, with the upper surface of dielectric layer 32; and local removal of metal layer 61 to define a plurality of metal portions insulated from one another, arranged in an arrangement identical or similar to that of the metal portions defined in metal layer 53 in the structure of FIG. 7A.

The rest of the method is similar to what has been previously described in relation with FIGS. 6H to 6K.

FIG. 7C illustrates the structure obtained at the end of the method. It should be noted that, in this variant, the bonding of the structure of FIG. 7A to the structure of FIG. 7B is a direct metal-to-metal bonding between the surface of metal layer 53 opposite to semiconductor layer 20 (that is, its lower surface in the orientation of FIG. 7C) and the surface of metal layer 61 opposite to substrate 30 (that is, its upper surface in the orientation of FIG. 7C).

The stack of the portions of metal layers 61 and 53 in front of lower electrodes E1 corresponds to the portions of metal layers 501 of the structure of FIGS. 5A and 5B. Insulated conductive vias 51 correspond to the connection elements 311 of the structure of FIGS. 5A and 5B.

Various embodiments and variants have been described. Those skilled in the art will understand that certain features of these various embodiments and variants may be combined, and other variants will occur to those skilled in the art. In particular, the described embodiments are not limited to the specific examples of materials and of dimensions mentioned in the present disclosure.

Further, the described embodiments are not limited to the specific examples of structures of CMUT transducers described hereabove, nor to the specific examples of CMUT transducers manufacturing method described hereabove. It should in particular be noted that the provided solution may be applied to CMUT transducers formed by surface micromachining.

It should further be noted that the described embodiments are not limited to the examples shown in the drawings where the rows and columns of transducers of the device are rectilinear, and where the rows are orthogonal to the columns. As a variant, the rows and/or the columns of transducers of the device are non-rectilinear. Further, the rows, respectively the columns, of transducers, may not be parallel to one another. Further, the rows of transducer may not be orthogonal to the columns.

More generally, the described embodiments may be adapted to any type of ultrasonic transducer having a lower electrode and an upper electrode, and be adapted to be controlled according to a row-column addressing, for example, piezoelectric transducers, for example transducers of PMUT ("Piezoelectric Micromachined Ultrasonic Transducers") type.

The invention claimed is:

1. A row-column addressing ultrasonic imaging device comprising a plurality of ultrasonic transducers arranged in rows and columns, each transducer comprising a lower electrode and an upper electrode, wherein:

in each row, any two neighboring transducers in the row respectively have their lower electrode and their upper electrode connected to each other, or their upper electrode and their lower electrode connected to each other so that, in each row, a row conductor common to all the transducers in the row winds vertically between the transducers in the row, alternately running through the lower and upper electrodes of the transducers in the row; and in each column, any two neighboring transducers in the column respectively have their lower electrode and their upper electrode connected to each other, or their upper electrode and their lower electrode connected to each other so that, in each column, a column conductor common to all the transducers in the column winds vertically between the transducers in the column, alternately running through the lower and upper electrodes of the transducers in the column.

2. The device according to claim 1, wherein:

in each row, any two neighboring transducers in the row have their respective lower electrodes electrically insulated from each other and their respective upper electrodes electrically insulated from each other; and in each column, any two neighboring transducers in the column have their respective lower electrodes electrically insulated from each other and their respective upper electrodes electrically insulated from each other.

3. The device according to claim 1, wherein each ultrasonic transducer is a capacitive micromachined ultrasonic transducer comprising a flexible membrane suspended above a cavity, the lower electrode of the transducer being arranged on the side of the cavity opposite to the flexible membrane, and the upper electrode of the transducer being arranged on the side of the flexible membrane opposite to the cavity.

4. The device according to claim 3, wherein the cavities of the transducers are formed in a rigid support layer, and wherein each transducer has its upper electrode electrically connected to a lower electrode of a neighboring transducer via a conductive element crossing the rigid support layer.

5. The device according to claim 3, wherein the lower electrode of each transducer is made of a doped semiconductor material.

6. The device according to claim 5, wherein a metal layer portion extends under the lower electrode of each transducer, in contact with the lower surface of the lower electrode of the transducer.

7. The device according to claim 3, wherein, in each transducer, the flexible membrane is made of a semiconductor material.

8. The device according to claim 3, wherein, in each transducer, a dielectric layer coats the upper surface of the lower electrode of the transducer, at the bottom of the cavity.

9. The device according to claim 1, wherein each transducer is a piezoelectric micromachined ultrasonic transducer.

* * * * *